(12) United States Patent
Lou et al.

(10) Patent No.: US 7,650,712 B2
(45) Date of Patent: Jan. 26, 2010

(54) AUTOMATIC FISHING DEVICE

(76) Inventors: Gary Enguo Lou, 700 Cochise Ct., Fremont, CA (US) 94539; Effie Teng Lou, 700 Cochise Ct., Fremont, CA (US) 94539

( * ) Notice: Subject to any disclaimer, the term of this patent is extended or adjusted under 35 U.S.C. 154(b) by 274 days.

(21) Appl. No.: 11/156,945

(22) Filed: Jun. 20, 2005

(65) Prior Publication Data
US 2006/0005453 A1    Jan. 12, 2006

Related U.S. Application Data

(60) Provisional application No. 60/586,172, filed on Jul. 8, 2004.

(51) Int. Cl.
*A01K 91/10* (2006.01)
(52) U.S. Cl. .............................. 43/15; 43/16
(58) Field of Classification Search ............ 43/15, 43/16
See application file for complete search history.

(56) References Cited
U.S. PATENT DOCUMENTS

| | | | |
|---|---|---|---|
| 3,889,413 A | 6/1975 | Snider | |
| 4,034,498 A * | 7/1977 | Ikarimoto | 43/15 |
| 4,142,315 A | 3/1979 | Hoffman | |
| 4,204,355 A * | 5/1980 | Almond | 43/15 |
| 5,109,624 A * | 5/1992 | Bryan | 43/15 |
| 5,495,688 A * | 3/1996 | Sondej et al. | 43/16 |
| 5,542,205 A | 8/1996 | Updike | |

* cited by examiner

*Primary Examiner*—Kurt Rowan

(57) ABSTRACT

An automatic fishing device for pulling the fishing line upon fish strike to set the hook. It embodies a trigger member, a weight member, a trigger support, a fish line and a connector for attaching the weight member to the fishing line. The trigger member includes a weight support element and a fish line coupler. Parts of the weight support element can support the weight member but other parts of weight support element cannot support the weight member. The weight member can be connected to the fish line by the connector. The movement of fishing line caused by a fish strike rotates the trigger member to unload the initially supported weight member to drag the fishing line downward, effectively tightening the fishing line for setting the hook.

3 Claims, 6 Drawing Sheets

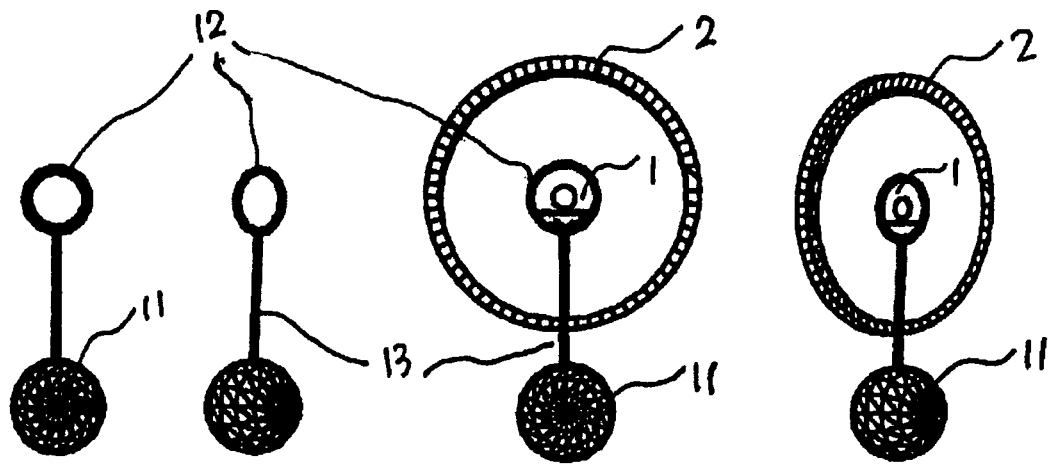
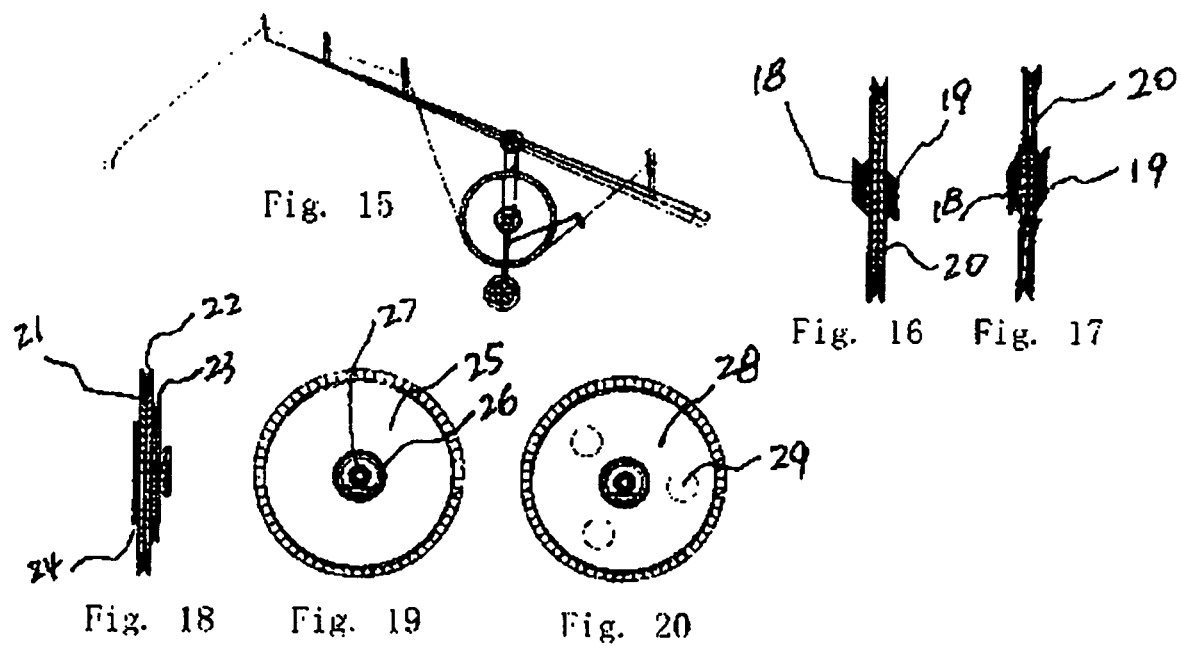
Fig. 11  Fig. 12  Fig. 13  Fig. 14
Fig. 15
Fig. 16  Fig. 17
Fig. 18  Fig. 19  Fig. 20

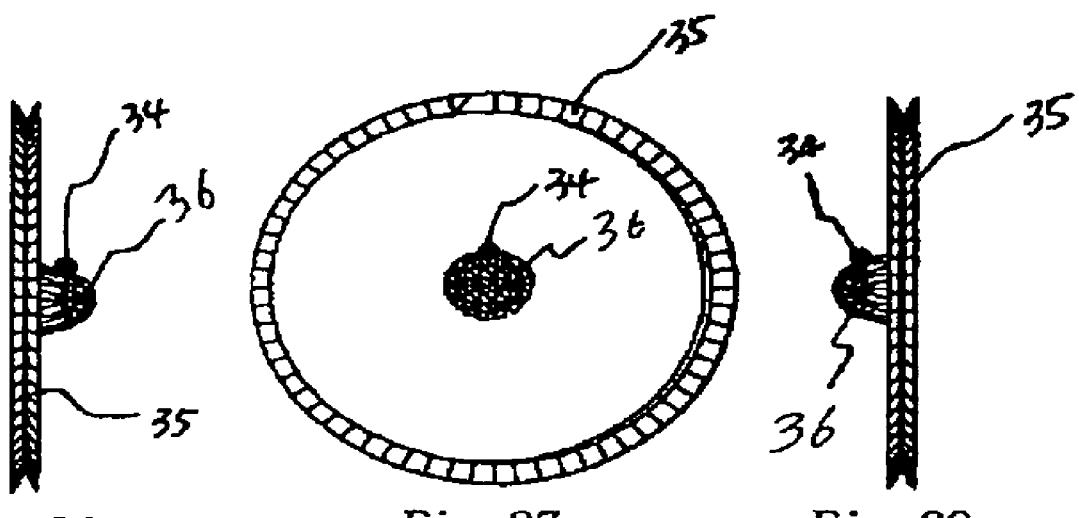

AUTOMATIC FISHING DEVICE

BACKGROUND OF INVENTION

Numerous existing automatic fishing and automatic hook setting devices use combination of a spring device and a triggering device to either lift the fishing rod upward, or to pull the fish line, upon a fish strike. Many of these inventions are fishing rod holder devices. The spring device used in these rod holder type devices is to store energy for lifting the fishing rod, and the trigger device is used to transforming the tug of the line by a fish strike to trigger the release of energy stored in the spring device. U.S. Pat. No. 3,889,413, issued on Jun. 17, 1979 to Robert T. Snider and Jessie G. Zimmerman, U.S. Pat. No. 4,142,315, issued on May 2, 1977 to Gary J. Hoffman, and U.S. Pat. No. 5,542,205, issued on Aug. 6, 1996 to Lester Updike, is among this type of inventions. The combination of a spring device and triggering device in such cases mimics the use of energy stored in the human muscle and reaction of a fisherman to a fish strike.

Combination of a spring device and triggering device for an automatic fishing device usually means that the manufacturing processes of those devices are likely to be complicated, and the cost of such devices can be high. Many fishing rod holder devices are also heavy, not practical to carry around, or easy to setup. Not easy to use or high cost limits the practical application and market acceptance of those devices.

Besides using spring as the store of energy in automatic fishing devices, there are inventors who use a weight instead of spring to store energy. U.S. Pat. No. 4,204,355 issued on May 27, 1980, to William C. Almond, describes a simple automatic fish catcher using a weight for pulling the fish line. This fish catcher uses a horizontal supporting arm to hang a weight, and the fish line is attaches to the weight so that the tightening of the fish line by a fish strike will drag the weight out of the horizontal supporting arm, causing the weight to fall, pulling the fishing with it. Although it is a low cost and easy to use device for automatic fishing, this device has the certain limitations. For example, the arm for supporting the weight has to be set up horizontally. Out of horizontal position will either cause the weight to fall by itself, or make it harder for fish to move the weight outward to fall. The biting fish has to apply considerable force to move such weight outward. This may reduce the effectiveness of the device. Also, the weight of this device needs considerable falling height to lift hooked fish to the water surface; it is not suitable in place of shallow water. This device only works when the direction of the fish bite is away from the fishing device to cause the tightening of the fish line. If fish bites in opposite direction, setting the fish line loose, the weight will stay still, giving opportunity for the fish to escape.

In fact, many automatic fishing devices only work when fish is biting away from the fishing device. They depend on the tightening of fish line to trigger the hook setting devices. They are ineffective when fish is biting toward the fishing device, in such case the fish line is loosening instead of tightening. In general, when movement of the fish cause the fish line to loose, it is much harder for a fisherman to catch the fish with or without an automatic fishing device. Since it is harder to detect the loosening of the line, and it is harder to get the good timing for pulling fishing line.

SUMMARY OF INVENTION

The present invention provides an automatic fishing device comprising a weight member, a trigger member, a trigger member support, a fish line and a connector for attaching weight member to the fish line.

The weight member includes a hook, a weight and a connector that connects the weight to the hook.

The trigger member is a rotational type apparatus comprising a weight support means and a fish line support means. The weight support means provides support to the weight member by allowing the hook of the weight member to hang onto its edge. The weight support means is shaped to support the weight member in certain rotational positions, but will let the weight member to fall in other rotational positions. The fish line support means has a grooved edge for holding and pressuring the fish line. The trigger member is supported by the trigger member support. If the fish line is not pressuring the fish line supporting means, the trigger member can freely rotate in either clockwise or counter clockwise directions on the trigger member support.

The movement of the fish line through the fish line support means provides the rotational force for the trigger member. When fish strikes, the movement of the fish line rotates the trigger member to let the initially supported weight member to fall. The falling weight member in turn drags the fish line downward, effectively pulling the fish line and setting the hook.

BRIEF DESCRIPTION OF DRAWINGS

FIG. 11 is the front view of the weight member of the preferred embodiment 1.

FIG. 12 is the perspective view of the weight member of the preferred embodiment 1, illustrating the front and right view thereof.

FIG. 13 is the front view of the trigger member supporting the weight member of the preferred embodiment 1. In FIG. 13, the weight member is hanging on the trigger member.

FIG. 14 is the perspective view of the trigger member supporting the weight member of the preferred embodiment 1, illustrating the front and right view thereof. In FIG. 14, the weight member is hanging on the trigger member.

FIG. 15 is the front view of the trigger member supporting the weight member of the preferred embodiment 2. In FIG. 15, the weight member is hanging on the trigger member.

FIG. 16 is the left view of the trigger member of the preferred embodiment 3.

FIG. 17 is very similar to FIG. 16; the difference is that the trigger member on FIG. 17 is turned 180 degree.

FIG. 18 is the left view of the trigger member of the preferred embodiment 4.

FIG. 19 is the front view of the trigger member of the preferred embodiment 5.

FIG. 20 is the front view of the trigger member of the preferred embodiment 6.

FIG. 26, FIG. 27, FIG. 28 are the right view, front view, left view of the preferred embodiment 12, respectively.

PREFERED EMBODYMENTS

Figure 1:
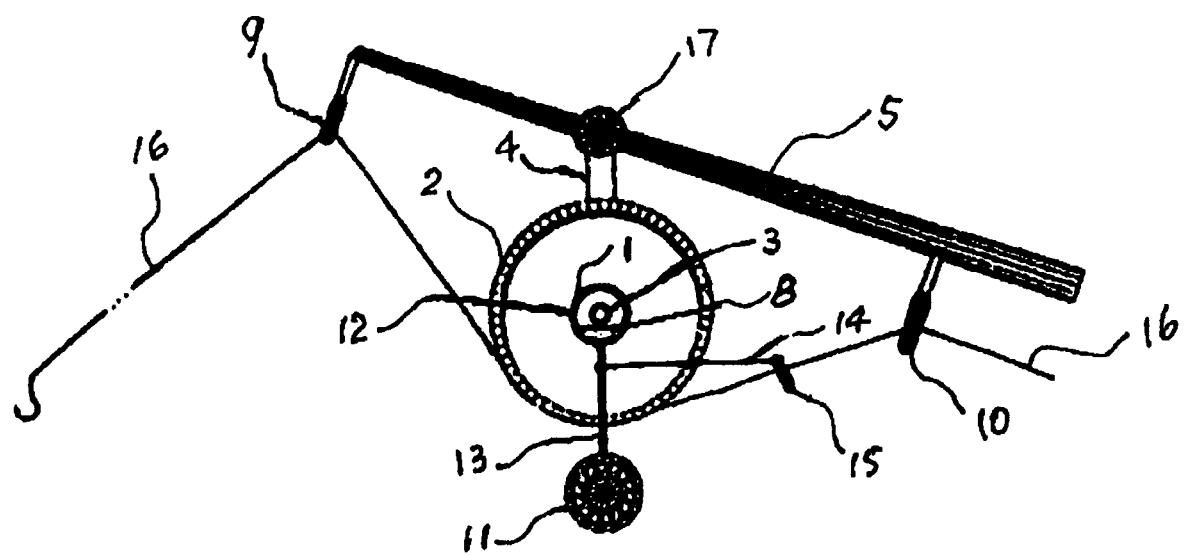
FIG. 1 is the front view of the preferred embodiment 1. In this figure, the weight member is hanging on the trigger member.
Figure 2:
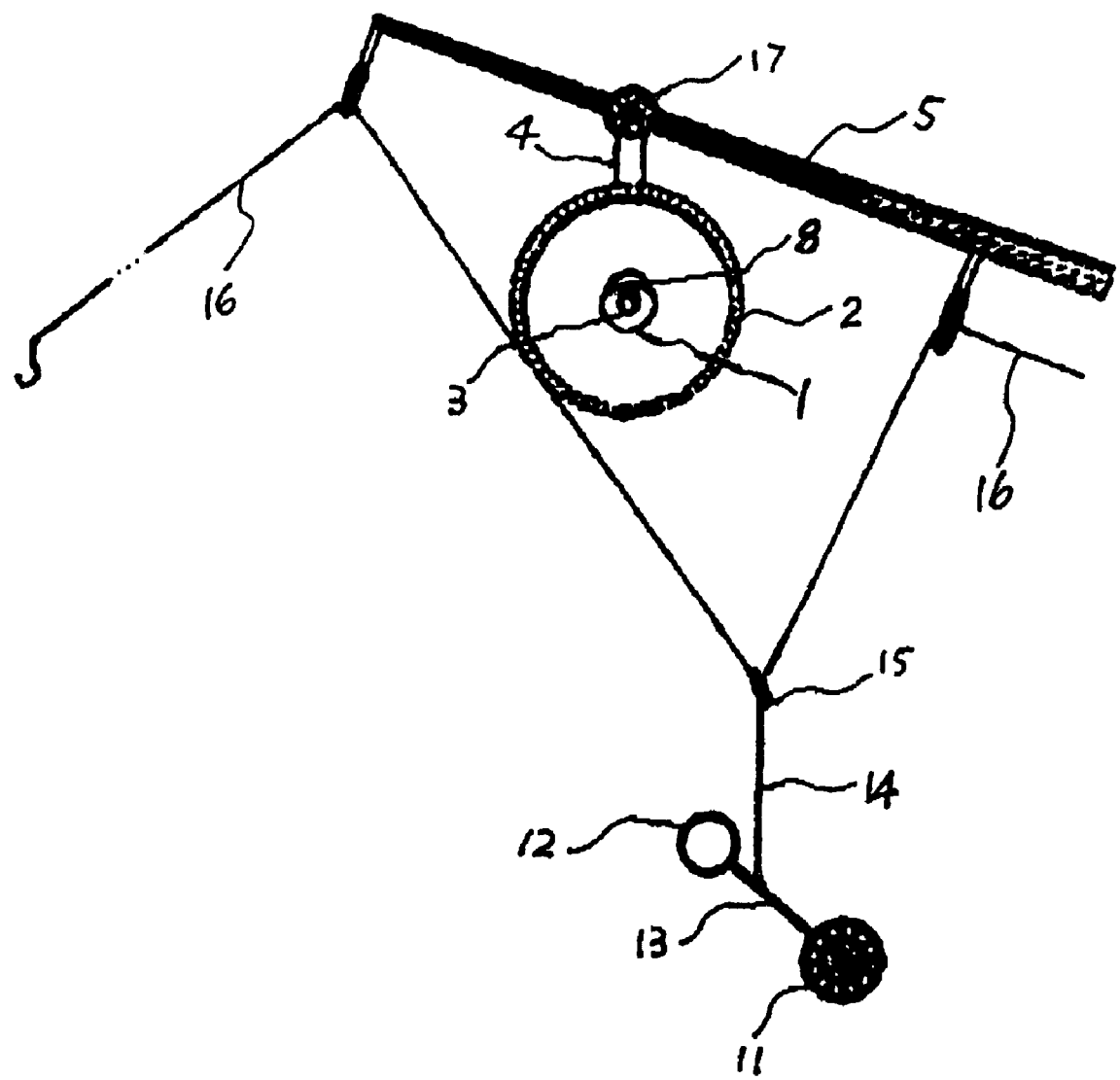
FIG. 2 is the front view of the preferred embodiment 1. The FIG. 2 is illustrating the same embodiments as in FIG. 1, except the weight member is falling off from the trigger member.
Figure 3:
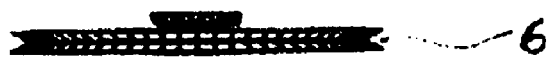
FIG. 3 through FIG. 7 is the top view, the right view, the front view, the left view and the bottom view of the trigger member of the preferred embodiment 1, respectively.
Figure 4:
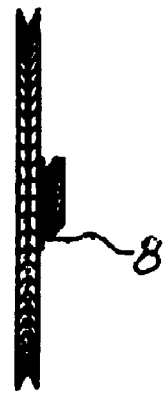
Figure 5:
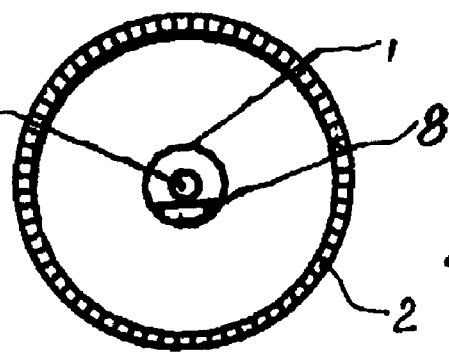
Figure 6:
Figure 7:
Figure 8:
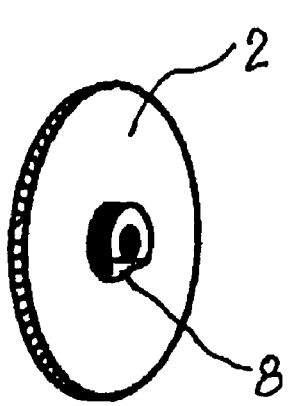
FIG. 8 is the perspective view of the trigger member of the preferred embodiment 1, illustrating the front and left view thereof.
Figure 9:
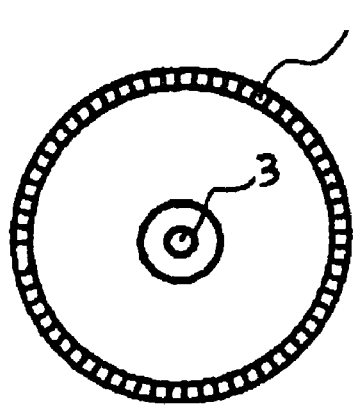
FIG. 9 is the back view of the trigger member of the preferred embodiment.
Figure 10:
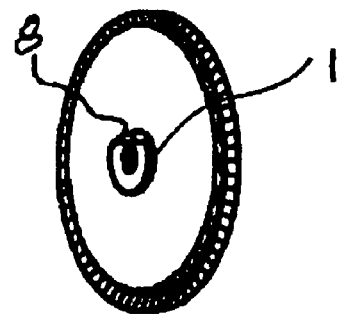
FIG. 10 is the perspective view of the trigger member of the preferred embodiment, illustrating the front and right view thereof, after the trigger member is turned 180 degree.

The trigger member is the essential element of this invention. The trigger member can be made in various shapes or different types. For example, in terms of different shapes of the trigger member, there can be round shaped, oval shaped, fan shaped, bar shaped and other suitable shapes. In terms of different type of trigger member, there can be weight support means on only one side trigger member, or on both sides; there can be only one fish line support means on the trigger member, or more than one fish line support means with different sizes.

Because the round shaped trigger member with single weight support means and single fish line support means may be easy to use, easy to produce and typical to demonstrate the operation principles of this invention, preferred embodiment 1 descries it in detail. Embodiments of other shapes or other types of trigger member are easily understood after the explanations of the preferred embodiment 1.

Preferred embodiments 1: Refer to FIG. 1 through FIG. 14. FIG. 1 through FIG. 14 demonstrated various elements and operating states of the preferred embodiment 1, using the round shaped trigger member. Trigger member is comprised by the weight support means 1 and a round fish line support means 2. The weight support means has a groove 7 on its out edge for hanging the weight member through the hook 12 of the weight member. Part of the weight support means 1 is cut out to form the beveled flat surface 8. This cut eliminated portion of the groove 7. The weight support means 1 and the fish line support means 2 are fixed together and are concentric in this embodiment. The trigger member can rotates on a rotational axis 3 that is part of the trigger member support 4 mounted on a fishing rod 5. The radius of the fish line support means 2 is bigger than the radius of the weight support means 1. The outer edge of the fish line support means 2 has fish line groove 6. There are two fish line guides 9 and 10 on the fishing rod 5. The weight connector 13 connects weight 11 and hook 12 together. One end of fishing line connector 14 connects the weight member, and the other end connects to fishing line 16 through connector 15. The weight connector 15 can be easily attached to the fish line 16, and easily detached from fish line 16. The trigger member support 4 can be attached to fishing rod 5 or detached from fishing rod 5 through trigger anchor means 17. If beveled flat surface 8 is facing downward, the groove 7 on outer edge of weight support means can support the weight 11 through the hook 12. FIG. 13 and FIG. 14 illustrate this. If the trigger member rotates, the weight member will fall off from trigger member support only if the beveled flat surface 8 is rotated to an upward position. Because the radius of the groove on fish line support means 6 is bigger than the radius of the groove 7 on the outer edge of weight support means, a small force provided by the movement of the fish line 16 is able to rotate the trigger member. This leverage makes the trigger member very sensitive.

The combination of the weight member and trigger member is to keep weight member hanging on the trigger member when there is no fish strike, and to let the weight member drop suddenly when fish strikes. The drop of the weight member drags the fish line down. The effect of the drop of the weight member is similar to the effect of angler lifting the fishing rod, or to roll in the line; Since most fishing setups has the loose end at fish hook end, the other end is relatively tight at reel end.

Embodiment 2: Refer to FIG. 15. A round shaped trigger member is embodied on a fishing rod with fish line guide rings facing upward. The fishing reel (not shown) can face either upward and downward. The operation principles are similar to that of the embodiment 1.

Embodiment 3: Refer to FIG. 16 and FIG. 17. The trigger member 20 is made to have two weight support means 18 and 19, one on each side of trigger member. The lengths of the groove of the weight support means 18 and 19 are different, so that the shorter one is easier to let the weight member to fall off and the longer one will need more rotation to let the weight member to fall. The trigger member can be made to let either the weight support means 18 on the left or weight support means 19 on the left. Depend of whether the angler is left handed or right handed and behavior of the targeted fish, the angler can choose one of these two weight support means at a time.

Embodiment 4: Refer to FIG. 18. Fish line support means 21 of the trigger member has more than one fish line groove with different radius. On FIG. 18, there are three fish line groove 22, 23, 24. Angler may choose among them to adjust the sensibility of this device.

Embodiment 5: Refer to FIG. 19. A ball bearing roller 27 is added to the common center of the weight support means 26 and fish line support means 25 to make the trigger member more sensitive.

Embodiment 6: Refer to FIG. 20. Holes 29 can be made on the fish line support means 28 of the trigger member for inserting weight. One or more inserted weight can change the sensibility of the trigger member to let the rotation of the trigger member easier on one direction and harder on the other direction, or easier at the beginning of the rotation and harder towards the point at which the weight member will drop.

Figure 21:
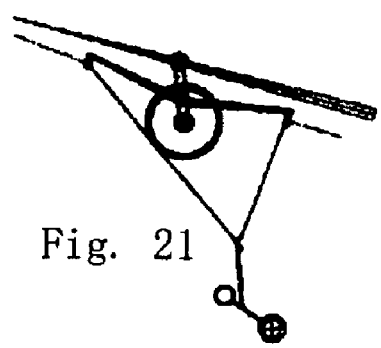
FIG. 21 is the front view of the preferred embodiment 7.

Embodiment 7: Refer to FIG. 21. For fishing rod that has no line guide rings, a simple line guide device with two line guide rings at both ends can be installed on the trigger member support.

Figure 22:
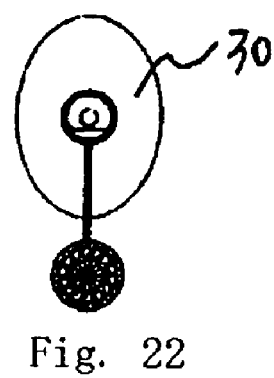
FIG. 22 is the front view of the preferred embodiment 8. In this figure, the trigger member is supporting the weight member.

Embodiment 8: Refer to FIG. 22. In embodiment 8, the fish line support means 30 has an oval shape.

Figure 23:
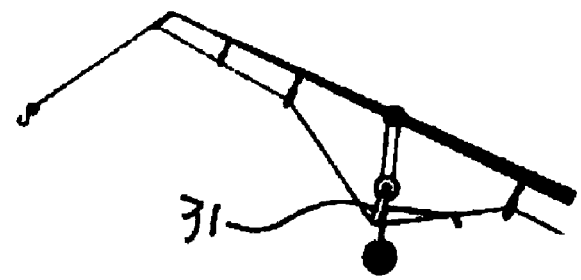
FIG. 23 is the front view of the preferred embodiment 9. In this figure, the trigger member is supporting the weight member.

Embodiment 9: Refer to FIG. 23. In embodiment 9, the fish line support means 31 has a bar shape.

Figure 24:
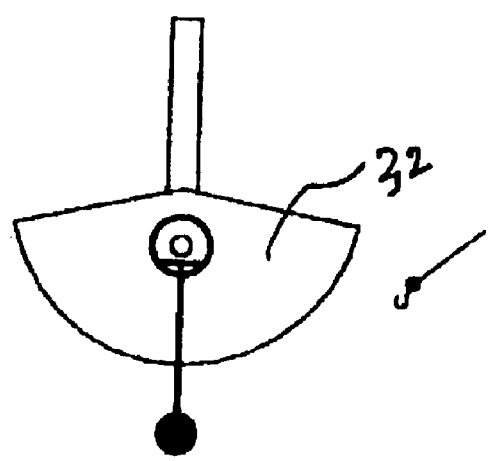
FIG. 24 is the front view of the preferred embodiment 10. In this figure, the trigger member is supporting the weight member.

Embodiment 10: Refer to FIG. 24. In embodiment 10, the fish line support means 32 has a fan shape.

Figure 25:
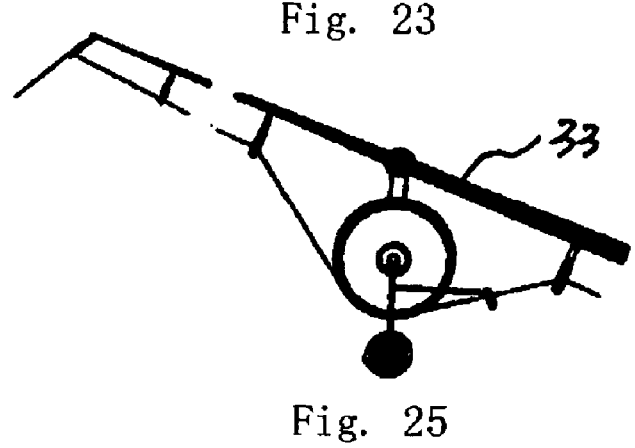
FIG. 25 is the front view of the preferred embodiment 11. In this figure, the trigger member is supporting the weight member.

Embodiment 11: Refer to FIG. 25. In embodiment 11, a commonly used long fishing rod 33 with multiple ling guide rings is used as the supporting apparatus. This figure is very similar to FIG. 1 that shows a shorter fishing rod with only two ling guide rings as the supporting apparatus.

Embodiment 12: Refer to FIG. 26, FIG. 27 and FIG. 28. The weight support means has a half sphere surface 36 with a small solid dome 34 fixed on the surface. The space between the walls of fish line support means 35 and the surface of dome 34 forms a surface to hang the weight member.

Although above embodiments may differ in shape, or differ marginally in functionality, their main operation principals are the same. Embodiments provided here are for illustrating some of the many ways to construct this automatic fishing device; it should not be construed as limiting the scope of the invention but as merely providing illustrations of some of the presently preferred embodiments of this invention. Various other embodiments and ramifications are possible and can be too numerous to illustrate. Thus the scope of the invention should be determined by the appended claims and their legal equivalents, rather than by the examples of embodiments given above.

Operations

1. The trigger member should have certain height clearance from the ground or water surface. This height determines the maximum distance the weight member can fall, or the maximum relocation distance of fishing hook at end of the fish line. If the trigger member is above a water surface, the height of the trigger member from the water surface can be reduced, since the maximum distance the weight member can fall includes the water depth.

2. Angler set the bait on hook if bait is to be used and cast the hook into water. After making the fish line somewhat tight as required, angler let the fish line go through the groove of the fish line support means. The fish line should have certain pressure on the trigger member; prevent the free rotational movement of the trigger member.

3. Angler then connects the fishing line to the weight member through the connector and hangs the hook of the weight member onto the groove of the weight supporting means. At this moment, the part of the weight support means that has a surface that cannot support the weight member should be rotated downward. If the fish line gets loose in the process, make the line tight again.

4. When fish strikes, if the fish bite away from the angler, the fish line will make the trigger member rotate in clockwise direction. When the part of the weight support means that has no groove rotates up to the point that the weight support means can no longer support the weight member, the sudden fall of the weight member will drag the fish line down. This causes the tightening of the fishing line and set the fish. If the fish bites toward the angler, then the loosening of the fishing line can make the trigger member rotate in counter clockwise direction. This is because the tension change of the fish line from tight to loose. In this case, the weight member can still fall. Unlike many other automatic hook setting devices that can only work when direction of a fish bite is away from the device, this invention can work bi-directionally regardless which way the fish strike is.

5. While a hooked fish is struggling to escape, the weight member can go up and down on the fish line. The weight member can retain the tension of the fish line, preventing fish to escape. In some cases, such as a sudden and powerful pull by fish while the weight member consumes some length of the fish line in the downward position, the hanging weight member can protect the fish line.

6. Once the angler knows that a fish is hooked, the angler can let the weight member continue to be connected to the fish line to help retain the tension of the line; or the angler can remove the weight member from fish line, pulling the fish without the use of weight member.

7. Angler does not have to rely on the automatic fishing device for setting the hook. Before the weight member to fall from the weight supporting means, angler may decide to lift the fishing rod without waiting the weight member to fall. There is no penalty for overriding the functionality of this device. If the fish is hooked, the weight member can also be disengaged from the fish line. This invention gives a fishing man a useful tool; one can overrides the mechanical functions as condition arise. The engagement and disengagement of weight member is simple and can be instantly quick.

Benifits

1. Majority of automatic fishing devices or automatic hook setting devices only work when fish strike direction is away from the fishing device, causing the tightening of the fish line. They are ineffective if the fish strike direction is toward the fishing device, causing the loosening of the fish line. When fishing without automatic devices, it is hard for anglers to have the good timing to lift the rod when fish line suddenly loosens. Bell is often attached to the fishing rod by many anglers so that the sound can alarm the angler when fish is pulling the line. But there can be no sound when the fish strike is loosening the fishing line. It is quite often that after notice the loosening of the fishing, angler tries to lift the fishing rod, only to find that the good opportunity was lost. This invention has the bi-directional effectiveness; it works when fish strike direction cause the fish line to be loosening, moving the trigger member rotate counter clock wise, causing the weight member to fall. Since there is tension and tightness on the fish line before the loosening of the line occurs, change of the tension can make the trigger member rotate.

2. The automatic fishing device described here is sensitive and easy to adjust to fit fishing environment. For round shaped trigger member, since the radius of the groove on the fish line support means is bigger than the radius of the groove on the weight supporting means, small force of the passing fish line through the groove on the fish line support means will be able to rotate the trigger member with the weight member hanging on it. This leverage greatly increases the sensibility of the device. In windy whether, angler may adjust the initial position of the trigger position so that in order for the weight member to fall, the fish line needs to provide more rotation to the trigger member. Angler can adjust this initial position to adapt to striking habits of different fish, or optimal position for achieving the bi-directional effectiveness.

3. The current invention uses the weight member to drag down the fish line to set the hook. This helps the angler when he or she is not watching the fishing apparatus attentively, or he or she is not alert enough for a quick action on fish strike. The current invention can also exert proper force to the fish line. In the case of weight member fall due to loosening of the fish line, the falling weight member will accelerate in falling speed. The effect on the fish line is superior to the effect of a bouncing up of the tip of the fish fishing rod. The former has an increasing force, and the later has a reducing force. Since as the tip of the fishing rod became bend less, the potential force it has to resume to its straight state is less. This invention created a device, in addition to the flexible fishing rod and fishing reel that can make the fishing equipment more effective.

4. The current invention can be used as addition to conventional fishing rod that has fishing line guide rings and fishing reel. It can also be used with fishing rods without the fish line guide rings. This can be accomplished by adding two ling guide rings with a support and mount it on the trigger member support. The current invention will not force the user to abandon the old fishing habits. In certain circumstances, angler can lift the fishing rod anytime without waiting for the weight member to drop. Angler can also remove the weight member when pulling a hooked fish. The trigger member can be made to be removable from trigger member support to make it easy for the user to use or not use it according fishing conditions. If angler uses the fishing rod to let the reel and line guide rings facing upward, the current invention can be used the same way as in the case the downward position of line guide rings and reel.

5. The current invention make the shorter rod to approach effects of a longer rod, or a less flexible rod to approach the effects of the flexible rod. The weight member goes up and down with a struggling fish, making harder for the fish to escape, and making it less likely for the hooked fish to break the line. In case the weight member falls into deep water, such as fishing in the sea, the extra balance of force the weight member provided can be beneficial.

6. The current invention can improve the efficiency of the angler. Chances of lifting the fishing rod in response of fish strike without getting a hooked fish vary from angler to angler. Experiences of angler are certainly a big factor. In most cases, after the lift the fishing rod without hooking the fish, angler has to change bait, or recast the line again. Pulling the line may drop the bait, or largely relocated the hook. When recasting the line, angler is likely to recast the hook into the same spot where fish strike occurs, but the result may not be always desirable. Inaccurate cast means a longer wait for the next bite. When current invention is used, if the weight member is not falling into deep sea water or drop from high place to the ground, a few feet fall of the weight member only relocate the hook a short distance. The short relocation of the bait may still keep the bait on the hook and have good chance that the nearby fish can still sense it. Angler can just reset the weight member on the trigger member, not rolling in the hook and recast. The results is saving time and increase the fishing efficiency.

7. The current invention uses simple elements; it is light in weight; easy to carry; easy to install. It is easy to manufacture and commercialize. It can be a low cost, practical fishing apparatus.

8. The current invention has good adaptability. It can be mounted on a piece of wood stick, a fishing rod, on a fishing boat, or simply a piece of wood block. It can be used in shallow or deep water, in the sea or on the shore of the sea, river, or lake.

What is claimed is:

1. An automatic fishing device for setting a fishing hook mounted on a fishing rod with line guides for passing a fishing line there through comprising,
   a trigger anchor means mounted on said fishing rod between line guides,
   a trigger comprising a round fishing line support means mounted on a trigger support member, said trigger support member attached to said trigger anchor,
   said round fishing line support means having a groove and being rotatably mounted on a rotational axis at an end of said trigger support member opposite said trigger anchor,
   a weight support means mounted on said rotational axis concentrically with said round fishing line support means and attached thereto, said weight support means having a beveled flat surface on one side,
   a weight having a weight hook, with said weight hook removably mounted on said weight support means,
   a fishing line connector having two ends, a first end mounted to said weight hook, and a second end having a fishing line connector removably mounted to said fishing line, such that, in use, a fishing line under tension is mounted in said groove of the said round fishing line support means, thereby when a fish strikes to cause a pull at said fishing line or to cause loosening at said fishing line, said round fishing line support means and said weight support means rotate so that when said beveled flat surface face upwardly, the weight hook will be released from said weight support means and said weight drops causing said fishing line connector to pull the fishing line downwardly to hook a bitting fish.

2. An automatic fishing device according to claim 1, wherein said trigger anchor means, said trigger and said weight support means form a substantially unitary member.

3. An automatic fishing device according to claim 1, wherein said weight, said weight hook and said fishing line connector form a substantially unitary member.

* * * * *